(12) United States Patent
Zhu

(10) Patent No.: US 8,285,329 B1
(45) Date of Patent: Oct. 9, 2012

(54) MOBILE DEVICE-BASED CONTROL OF SMART CARD OPERATION

(75) Inventor: Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 574 days.

(21) Appl. No.: 11/695,344

(22) Filed: Apr. 2, 2007

(51) Int. Cl.
*H04M 1/00* (2006.01)
(52) U.S. Cl. .......................... 455/558; 235/380; 235/382
(58) Field of Classification Search .................. 455/406, 455/407, 558; 235/379, 380, 375, 382; 709/218
See application file for complete search history.

(56) References Cited

U.S. PATENT DOCUMENTS

| | | | |
|---|---|---|---|
| 5,530,232 A | 6/1996 | Taylor | |
| 5,923,884 A | 7/1999 | Peyret et al. | |
| 6,024,286 A | 2/2000 | Bradley et al. | |
| 6,142,369 A | 11/2000 | Jonstromer | |
| 6,250,557 B1 * | 6/2001 | Forslund et al. | 235/492 |
| 6,314,409 B2 | 11/2001 | Schneck et al. | |
| 6,390,374 B1 * | 5/2002 | Carper et al. | 235/492 |
| 6,490,601 B1 | 12/2002 | Markus et al. | |
| 6,824,064 B2 * | 11/2004 | Guthery et al. | 235/492 |
| 6,880,761 B1 * | 4/2005 | Ritter et al. | 235/492 |
| 6,886,741 B1 | 5/2005 | Salveson | |
| 6,896,183 B2 * | 5/2005 | Takano | 235/380 |
| 7,117,485 B2 | 10/2006 | Wilkinson et al. | |
| 7,146,159 B1 | 12/2006 | Zhu | |
| 7,343,351 B1 * | 3/2008 | Bishop et al. | 705/67 |
| 7,413,113 B1 | 8/2008 | Zhu | |
| 7,562,818 B1 | 7/2009 | Bierbaum et al. | |
| 7,568,631 B2 * | 8/2009 | Gibbs et al. | 235/494 |
| 7,644,859 B1 | 1/2010 | Zhu | |
| 7,729,948 B1 | 6/2010 | Gailloux et al. | |
| 7,926,714 B1 | 4/2011 | Zhu | |
| 7,980,476 B2 * | 7/2011 | D'Albore | 235/492 |
| 8,123,128 B1 | 2/2012 | Zhu | |
| 8,249,654 B1 | 8/2012 | Zhu | |
| 2002/0052754 A1 * | 5/2002 | Joyce et al. | 705/1 |
| 2004/0103063 A1 * | 5/2004 | Takayama et al. | 705/41 |
| 2004/0218741 A1 | 11/2004 | Welton | |
| 2004/0260647 A1 | 12/2004 | Blinn et al. | |
| 2006/0214005 A1 | 9/2006 | Agami et al. | |
| 2007/0060200 A1 | 3/2007 | Boris et al. | |
| 2007/0155362 A1 | 7/2007 | Davis | |
| 2007/0169043 A1 | 7/2007 | Violleau et al. | |
| 2007/0169183 A1 | 7/2007 | Kipnis et al. | |
| 2007/0250599 A1 | 10/2007 | Takayama et al. | |

OTHER PUBLICATIONS

Zhu, Kevin, "Context-based Card Selection Device", filed Jul. 14, 2008, U.S. Appl. No. 12/172,813.
Zhu, Kevin, "Context-based Card Selection Device", filed Dec. 4, 2009, U.S. Appl. No. 12/631,372.
Notice of Allowance dated Apr. 8, 2008; U.S. Appl. No. 10/901,630, filed Jul. 28, 2004.
Notice of Allowance dated Sep. 9, 2009; U.S. Appl. No. 12/172,813, filed Jul. 14, 2008.
Final Office Action dated Nov. 24, 2010, U.S. Appl. No. 11/863,228.

(Continued)

*Primary Examiner* — Nay A Maung
*Assistant Examiner* — Angelica Perez

(57) ABSTRACT

A system is provided for mobile device-based control of smart card operation. The system includes a mobile device comprising an electronic wallet and smart card applications. The system also includes a server to authenticate a request for smart card information from the mobile device. The server also provides the smart card information to the mobile device to enable the electronic wallet to access at least one of the smart card applications.

17 Claims, 5 Drawing Sheets

OTHER PUBLICATIONS

Notice of Allowance dated Dec. 14, 2010; U.S. Appl. No. 12/631,372, filed Dec. 4, 2009.
Office Action dated Mar. 14, 2011, U.S. Appl. No. 11/863,228.
Zhu, Kevin, Context-based Card Selection Device, filed Mar. 10, 2011, U.S. Appl. No. 13/045,306.
Final Office Action dated Jul. 21, 2011; U.S. Appl. No. 11/863,228.
Notice of Allowance dated Apr. 10, 2012; U.S. Appl. No. 11/863,228.
Notice of Allowance dated Oct. 27, 2011; U.S. Appl. No. 13/045,306, filed Mar. 10, 2010.
Office Action dated Jul. 9, 2010 U.S. Appl. No. 11/863,228.
Zhu, Kevin, "Dynamic Smart Card Application Loading," U.S. Appl. No. 11/863,228, filed Sep. 27, 2007.

* cited by examiner

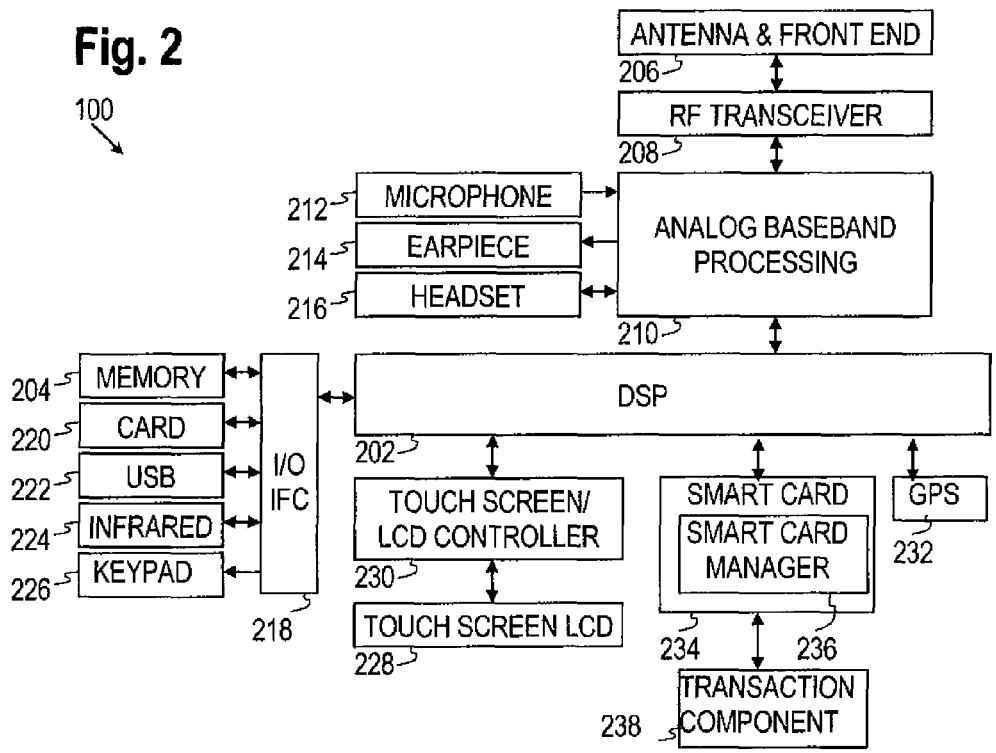
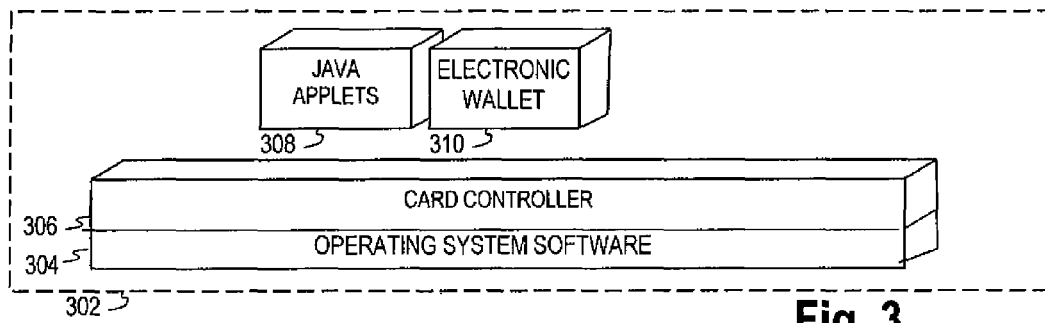

MOBILE DEVICE-BASED CONTROL OF SMART CARD OPERATION

CROSS-REFERENCE TO RELATED APPLICATIONS

This application includes subject matter related to the following application, which is hereby incorporated by reference:

U.S. Pat. No. 7,413,113 B1, issued Aug. 19, 2008, entitled "Context-Based Card Selection Device," by Kevin Zhu.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Transaction devices are portable items that store data, such as credit cards, debit cards, gift cards, access cards, and cards for various prepaid services or goods. Magnetically encoded transaction devices typically store data in a magnetic strip. "Smart cards" are transaction devices that store data in non-volatile memory, and typically contain data processing circuitry that offers some degree of computing capacity.

This application includes subject matter related to the following applications, which are hereby incorporated by reference: U.S. Pat. No. 6,024,286, issued Feb. 15, 2000, entitled "Smart card providing a plurality of independently accessible accounts," by Bradley, et al.; and U.S. Pat. No. 5,530,232, issued Jun. 25, 1996, entitled "Multi-application data card," by Taylor. U.S. Pat. No. 5,530,232 provides a multi-application smart card capable of substituting for a plurality of existing single-application smart cards that may be used in connection with several different accounts. A smart card reader enables the smart card user to select one of the applications on the smart card. U.S. Pat. No. 6,024,286 discloses a smart card that maintains up to four individual accounts, where each account is associated with a different quadrant of the card. The user simply selects the appropriate account by properly orienting the card upon inserting it into a smart card reader.

A smart card may be a "proximity read" smart card, which may communicate with a card reader without physically contacting the card reader. Communication between a proximity read smart card and various types of card readers may occur via a radio frequency signal, optical signal, wireless Internet connection, or other communication method known in the art. A proximity read smart card may be a radio frequency identification card, or RFID card. When an RFID card is brought into the proximity of a card reader, a radio frequency signal may be exchanged between the RFID card and the card reader. An RFID card may be used to make automatic payments at, for example, highway tolls, or to provide access to restricted areas. An RFID card in an automobile may be read by a card reader at a toll booth. As the automobile passes through the toll booth, the card reader may cause a toll to be automatically deducted from a prepaid account or billed to a credit card.

A mobile device, such as a mobile phone, may include a smart card. Thus, if a card reader is present at a location where commercial transactions occur or where proximity read smart cards are used, the smart card in the mobile device may make payments, provide access to restricted areas, and perform other functions or transactions typically performed by smart cards. A mobile device may implement the functionality of multiple smart cards by containing a super-smart card, a smart card that emulates multiple smart cards by containing multiple smart card applications. A smart card application is the software, hardware, or combination of both that provides the capability of a smart card. Multiple smart card applications on a smart card enable the smart card to emulate each smart card corresponding to each smart card application.

SUMMARY

The present disclosure provides systems and methods for mobile device-based control of smart card operation. In some embodiments, the system includes a mobile device and a server. The mobile device includes an electronic wallet and multiple smart card applications. The server authenticates a request for smart card information from the mobile device and provides the smart card information to the mobile device to enable the electronic wallet to access at least one of the smart card applications. In some embodiments, the mobile device may also include a user interface that selects at least one of the smart card applications for a transaction.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

FIG. 2 shows a block diagram of an illustrative mobile device.

FIG. 3 shows a block diagram of an illustrative software configuration for a mobile device according to some embodiments of the present disclosure.

DETAILED DESCRIPTION

It should be understood at the outset that although implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

Including a super-smart card in a mobile device creates security and communication problems. To maintain security, the vendor of each smart card application may provide proprietary software for the user of the mobile device to access the smart card application. Although the proprietary software may enable access to the smart card application that is provided by the same vendor, the software may not enable access to a smart card application that is provided by a different vendor. Therefore, a mobile device user may have to use multiple proprietary software applications to access and select any smart card application. The need for a mobile device user to use multiple proprietary software applications impairs the benefits of including the functionality of multiple smart cards on a mobile device. Accordingly, it would be desirable to provide a system and a method to enable a single electronic wallet application to access smart card applications provided by other vendors on the same mobile device.

Embodiments of the present disclosure enable a single electronic wallet application to access mobile device-based smart card applications provided by multiple vendors. Because the electronic wallet lacks the access enabling information needed to access other vendor's smart card applications, the mobile device can request the information from a server. The server has access to resources to verify that the mobile device requested the smart card information. If the request is authenticated, the server provides the access enabling information to the mobile device. The electronic wallet can use the access enabling information to access and select any of the available smart card applications for a transaction. In some embodiments of the present disclosure, the electronic wallet provides options through a user interface that enable a mobile device user to select a specific smart card application for a transaction.

Figure 1:
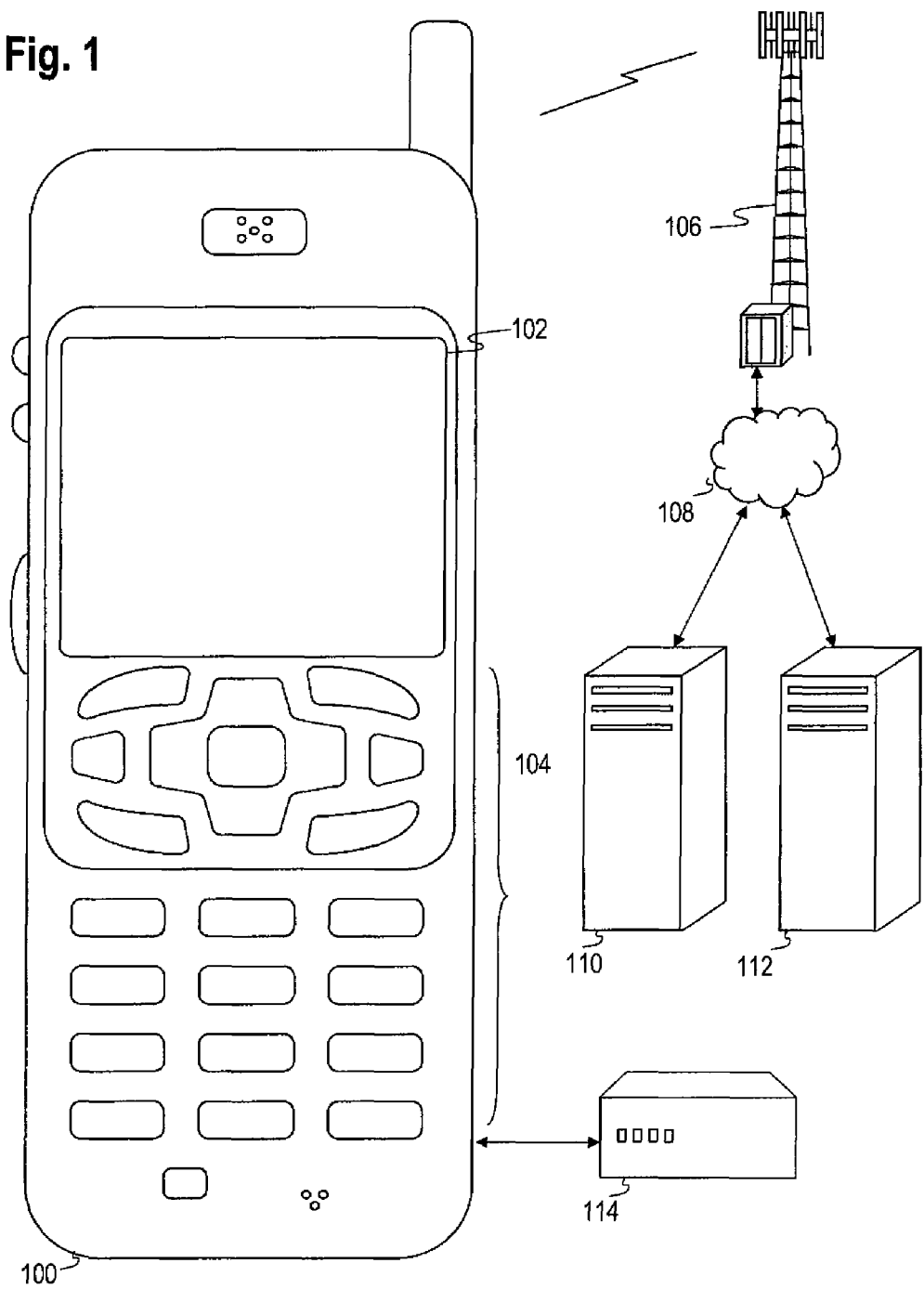
FIG. 1 shows an illustrative wireless communications system.

FIG. 1 shows a wireless communications system which provides the context for the systems and methods of the present disclosure. The wireless communication system includes an illustrative mobile device 100. Though illustrated as a mobile phone, the mobile device 100 may take various forms including a personal digital assistant (PDA), a mobile computer, a digital camera, a digital music player, and an electronic key fob for keyless entry. Many suitable mobile devices combine some or all of these functions.

The mobile device 100 includes a display 102 and a touch-sensitive surface or keys 104 with which to interact with a user. The mobile device 100 may present options for the user to select, controls for the user to actuate, and/or cursors or other indicators for the user to direct. The mobile device 100 may further accept data entry from the user, including numbers to dial or various parameter values for configuring the operation of the mobile device 100. The mobile device 100 may further execute one or more software or firmware applications in response to user commands. These applications may configure the mobile device 100 to perform various customized functions in response to user interaction.

Among the various applications executable by the mobile device 100 are an electronic wallet. The electronic wallet is an application that, in addition to providing the user with information regarding his financial accounts, may enable the user to access and select smart card applications on the smart card for use in carrying out commercial transactions such as, e.g., purchase of products and services. The electronic wallet may obtain user input from the keys 104, and may present output to the user through the display 102.

The mobile device 100 may communicate through a cell tower 106 and a wired network 108 to access information on various servers, such as a server 110. The server 110 may interact with an application provider server 112 through the wired network 108. While one application provider server is shown in FIG. 1, other servers could be present. The server 110 may act as a gateway to application provider server 112, which may include information needed by an electronic wallet to access and select smart card applications on a smart card. The application provider server 112 may interact with the server 110, which may communicate with the mobile device 100 through the wired network 108 and the cell tower 106 by a standard wireless telephony protocol (such as code division multiple access), a wireless internet connection, or some other means of wireless communication.

The mobile device 100 may enable a smart card application to communicate with a card reader 114, or other vendor device, to engage in smart card transactions. The communication between the mobile device 100 and the card reader 114 may be a radio frequency signal, optical signal, an electrical or magnetic "contact reader" signal, or other communication method known in the art.

FIG. 2 shows a block diagram of the mobile device 100. The mobile device 100 includes a digital signal processor (DSP) 202 and a memory 204. As shown, the mobile device 100 may further include an antenna and front end unit 206, a radio frequency (RF) transceiver 208, an analog baseband processing unit 210, a microphone 212, an earpiece speaker 214, a headset port 216, an input/output interface 218, a memory card 220, a universal serial bus (USB) port 222, an infrared port 224, a keypad 226, a liquid crystal display (LCD) with a touch sensitive surface 228, a touch screen/LCD controller 230, a global positioning system (GPS) sensor 232, a smart card 234, a smart card manager 236 for the smart card 234, and a transaction component 238.

The DSP 202 or some other form of controller or central processing unit operates to control the various components of the mobile device 100 in accordance with embedded software or firmware stored in the memory 204. In addition to the embedded software or firmware, the DSP 202 may execute other applications stored in the memory 204 or made available via information carrier media such as portable data storage media like the memory card 220 or via wired or wireless network communications. The application software may comprise a compiled set of machine-readable instructions that configure the DSP 202 to provide the desired functionality, or the application software may be high-level software instructions to be processed by an interpreter or compiler to indirectly configure the DSP 202.

The antenna and front end unit 206 may be provided to convert between wireless signals and electrical signals, enabling the mobile device 100 to send and receive information from a cellular network or some other available wireless communications network. The RF transceiver 208 provides frequency shifting, e.g., converting received RF signals to baseband and converting baseband transmit signals to RF. The analog baseband processing unit 210 may provide channel equalization and signal demodulation to extract information from received signals, may modulate information to create transmit signals, and may provide analog filtering for audio signals. To that end, the analog baseband processing unit 210 may have ports for connecting to the built-in microphone 212 and the earpiece speaker 214 that enable the mobile device 100 to be used as a cell phone.

The DSP 202 may send and receive digital communications with a wireless network via the analog baseband processing unit 210. In some embodiments, these digital communications may provide connectivity to the application server 112, enabling the device to obtain information for accessing smart cards. The input/output interface 218 interconnects the DSP 202 and various memories and interfaces. The memory 204 and the removable memory card 220 may provide software and data to configure the operation of the DSP 202. Among the interfaces may be the USB interface 222 and the infrared port 224. The infrared port 224 and other optional ports such as a Bluetooth interface or an IEEE 802.11 compliant wireless interface may enable the mobile device 100 to function as a smart card, communicating wirelessly with other nearby mobile devices and/or wireless base stations. In some contemplated systems, the mobile device 100 is able to wirelessly exchange information at a point-of-sale when placed near a suitable transceiver, such as the card reader 114.

The keypad 226 couples to the DSP 202 via the I/O interface 218 to provide one mechanism for the user to make selections, enter information, and otherwise provide input to the mobile device 100. Another input mechanism may be the touch screen display 228, which may also display text and/or graphics to the user. The display controller 230 couples the DSP 202 to the touch screen display 228. The GPS sensor 232 is coupled to the DSP 202 to decode global positioning system signals, thereby enabling the mobile device 100 to determine its position.

The mobile device 100 may include a smart card 234, which may include a smart card manager 236. The smart card manager 236 may activate and deactivate smart card applications on the smart card 234 for a transaction. The mobile device 100 may include a transaction component 238 to enable the smart card 234 to communicate with a vendor device by wireless, such as infrared, optic or radio communication, wired, magnetic "contact reader," or other known or hereafter developed technologies. The vendor device may be point of sale, security, or any other vendor transaction devices, such as the card reader 114. The security for the smart card 234 may be enabled by hardware or software components on the mobile device 100, as part of the smart card 234, or combinations of both.

The ISO/IEC 7816 and ISO/IEC 7810 series of standards for contact smart cards define: the physical shape, the positions and shapes of the electrical connectors, the electrical characteristics, the communications protocols, the format of the commands sent to the card and the responses returned by the card, robustness of the card, and the functionality. The standard for contactless smart card communications is ISO/IEC 14443, dated 2001. An alternative standard for contactless smart cards is ISO 15693, which allows communications at distances up to 50 cm.

FIG. 3 illustrates a software environment 302 that may be implemented by the DSP 202. The DSP 202 executes operating system software 304 that provides a platform from which the rest of the software operates. The operating system software 304 provides drivers for the mobile device hardware with standardized interfaces that are accessible to application software. The operating system software 304 may transfer control between applications running on the mobile device 100. Also shown in FIG. 3 are a card controller 306, Java applets 308, and an electronic wallet 310. The Java applets 308 may configure the mobile device 100 to browse the web, play music, play games, and provide utilities and other functionality.

The card controller 306 is a component that may be implemented as a hardware, firmware, or software device driver. Device drivers often form part of the lowest level of the operating system with which they are linked. Some systems have loadable device drivers which can be installed from files after the operating system is running. The card controller 306 may enable the electronic wallet 310 to communicate with the smart card manager 236 on the smart card 234. The card controller 306 is responsible for accessing the hardware registers of the smart card manager 236 and often includes an interrupt handler to service interrupts generated by the smart card manager 236. The electronic wallet 310 is an application that, in addition to providing a user with information regarding his financial accounts, may enable the user to access and select smart card applications on the smart card 234. The electronic wallet 310 may obtain user input from the keys 104, the keypad 226 or the liquid crystal display (LCD) with a touch sensitive surface 228 through the touch screen/LCD controller 230, and may present output to a mobile device user through the display 102.

Figure 4:
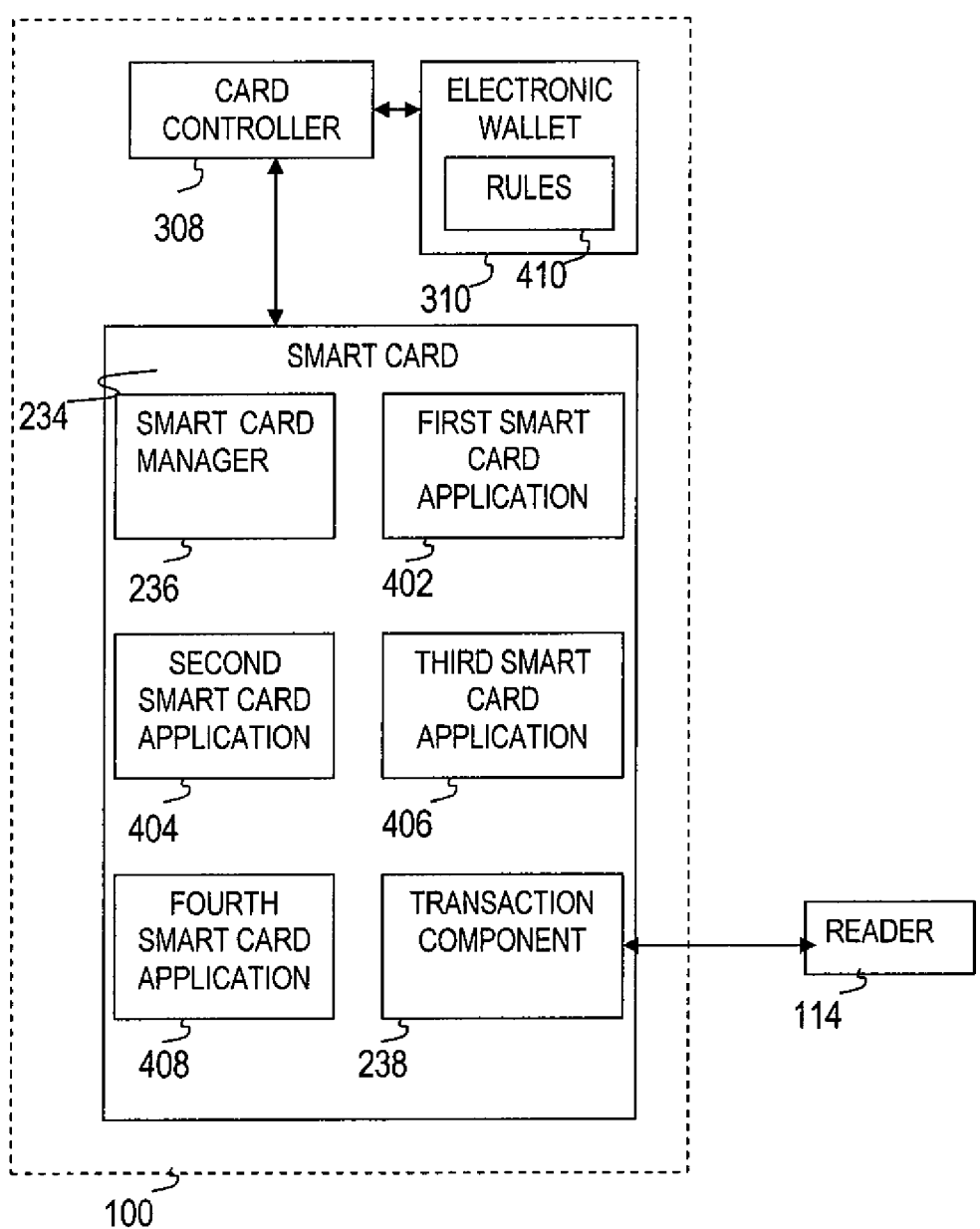
FIG. 4 shows a block diagram of a system for mobile device-based smart card operation according to some embodiments of the present disclosure.

FIG. 4 shows a block diagram of a system for mobile device-based smart card operation according to an embodiment of the present disclosure. The mobile device 100 contains the card controller 306, the electronic wallet 310 and the smart card 234. The smart card 234 may contain the smart card manager 236, a first smart card application 402, a second smart card application 404, a third smart card application 406, a fourth smart card application 408, and the transaction component 238. While four smart card applications are shown in FIG. 4, other numbers are also contemplated. The application provider server 112 may provide information needed by the electronic wallet 310 to access and select smart card applications on the smart card 234. The transaction component 238 may enable the smart card 234 to communicate with the card reader 114, or other vendor device, to engage in smart card transactions. The communication between the transaction component 238 and the card reader 114 may be a radio frequency signal, optical signal, an electrical or magnetic "contact reader" signal, or other communication method known in the art.

The electronic wallet 310 contains or has access to a set of context-based rules 410. While the rules 410 are shown in FIG. 4 as part of the electronic wallet 310, the rules may also reside elsewhere, such as on the server 110. The electronic wallet 310 may process the rules 410, smart card information, and context information to determine which of the smart card applications, 402, 404, 406, or 408 are appropriate for a transaction.

The rules 410 specify which smart card applications may be used in which context, and may be created or modified in several ways. An interface on the mobile device 100 may be used to create or modify the context-based rules 410. A mobile device user may manually select the rules she wishes to use from a set of predefined rules or a menu of rule options. Rule-related information may be entered through the keys 104, the keypad 226 or the liquid crystal display (LCD) with a touch sensitive surface 228 through the touch screen/LCD controller 230, and stored on the server 110. The rules 410 may be retrieved from the server 110 as needed by the electronic wallet 310. Alternatively, the rules 410 may be transferred from the server 110 to the electronic wallet 310 and stored there. Faster response may be achieved if the rules 410 reside in the electronic wallet 310 rather than in the server 110.

Rules 410 may be generated and modified via a desktop or laptop computer. The rules 410 may then be directly transferred to the mobile device 100, or indirectly transferred through the server 110. Alternatively, rule creation, either manual or automatic, may be performed on the server 110. After creation, the rules 410 may be stored on the server 110 and retrieved by the mobile device 100 as necessary. In the case where the mobile device 100 is a mobile telephone handset, communication of the rules 410 between the server 110 and the mobile device 100 may occur via standard mobile communications protocols, such as the code division multiple access protocol. Alternatively, a wireless internet connection or other means of wireless communication may be employed.

The mobile device 100 may select the appropriate smart card application to be employed in a particular situation based on the rules 410 for the context of the situation, wherein the context may be a set of interrelated conditions or circumstances that may apply to the situation. For a commercial transaction, the context may include, but is not limited to, the commercial establishment where the transaction may occur, the item that may be purchased, the amount of the purchase, the balance on the smart card application that may be used for the purchase, the credit limit on the smart card application that may be used for the purchase, electronic coupons that may be applicable to the purchase, reward programs that may be applicable to the purchase, the smart cards applications that may be accepted at the place of purchase, and the most recently used smart card application.

The context-based rules 410 may be interdependent. A rule may first specify the category of smart card application, such as credit card or debit card, to be used for the purchase. If, for example, a credit card may be used, another rule may determine which of several smart credit card applications may be used. That is, a selection may be made between a smart card application issued by a commercial establishment where the purchase is being made and one of several smart card applications issued by financial institutions.

One rule for determining which smart card application is to be used may specify that a certain smart card application is always to be used at a particular commercial establishment. The identity of a commercial establishment at which a transaction is being made may be determined by information received from the card reader 114 at the commercial establishment. Alternatively, a global positioning system, a similar satellite-based positioning system, or other location technique may be used to determine the location, and hence the identity, of the commercial establishment.

Another rule may relate the smart card application to be used to the amount of the purchase. That is, if the purchase price is below a specified level, one smart card application may be used and if the purchase price is above a specified level, another smart card application may be used. Similarly, the balance or the credit limit on a smart card application may determine which smart card application may be used. That is, if the balance or credit limit is below a specified level, one smart card application may be used and if the balance or credit limit is above a specified level, another smart card application may be used.

Another rule may recognize that only certain payment cards are accepted at a commercial establishment where a purchase is being made. The mobile device 100 may then present the mobile device user with a list of acceptable smart card applications. Other rules may specify that a default smart card application may be used unless the mobile device user selects a different smart card application or that the most recently used smart card application may be used for all transactions until the mobile device user changes the rule.

Other rules may deal with electronic coupons and loyalty reward programs. If a particular electronic coupon may be used at a particular commercial establishment only with a particular smart card application, a rule may specify that, if the mobile device 100 has the electronic coupon in question and is making a purchase at the commercial establishment in question, then the smart card application associated with the electronic coupon may be used. Similarly, if reward points may be earned only for purchases made with a particular smart card application, a rule may specify that the point-earning smart card application may be used. The rules 410 may use software-based formulas to determine the smart card application that will earn the most points and/or will make the best use of a coupon. Also, the rules 410 may alert the mobile device user when sufficient points have been accumulated to make a purchase and may offer the mobile device user the option of using points rather than a smart card application for a purchase. The rules 410 may enable the mobile device user to make a purchase with points for various categories of purchases, such as automobile fuel, airline tickets, convenience store snacks, grocery store food, and other goods and services available through retail merchants.

One of skill in the art will recognize that numerous other context-based rules are possible. In addition, multiple rules may be combined into more complex rules that depend on a multi-step logical process to select the smart card applications, electronic coupons, reward programs, and other options that are most appropriate for a context. For purposes of brevity of this disclosure, the vast number of context-based rules and combinations of rules that may be employed will not be discussed herein, but will readily suggest themselves to one skilled in the art.

Figure 5:
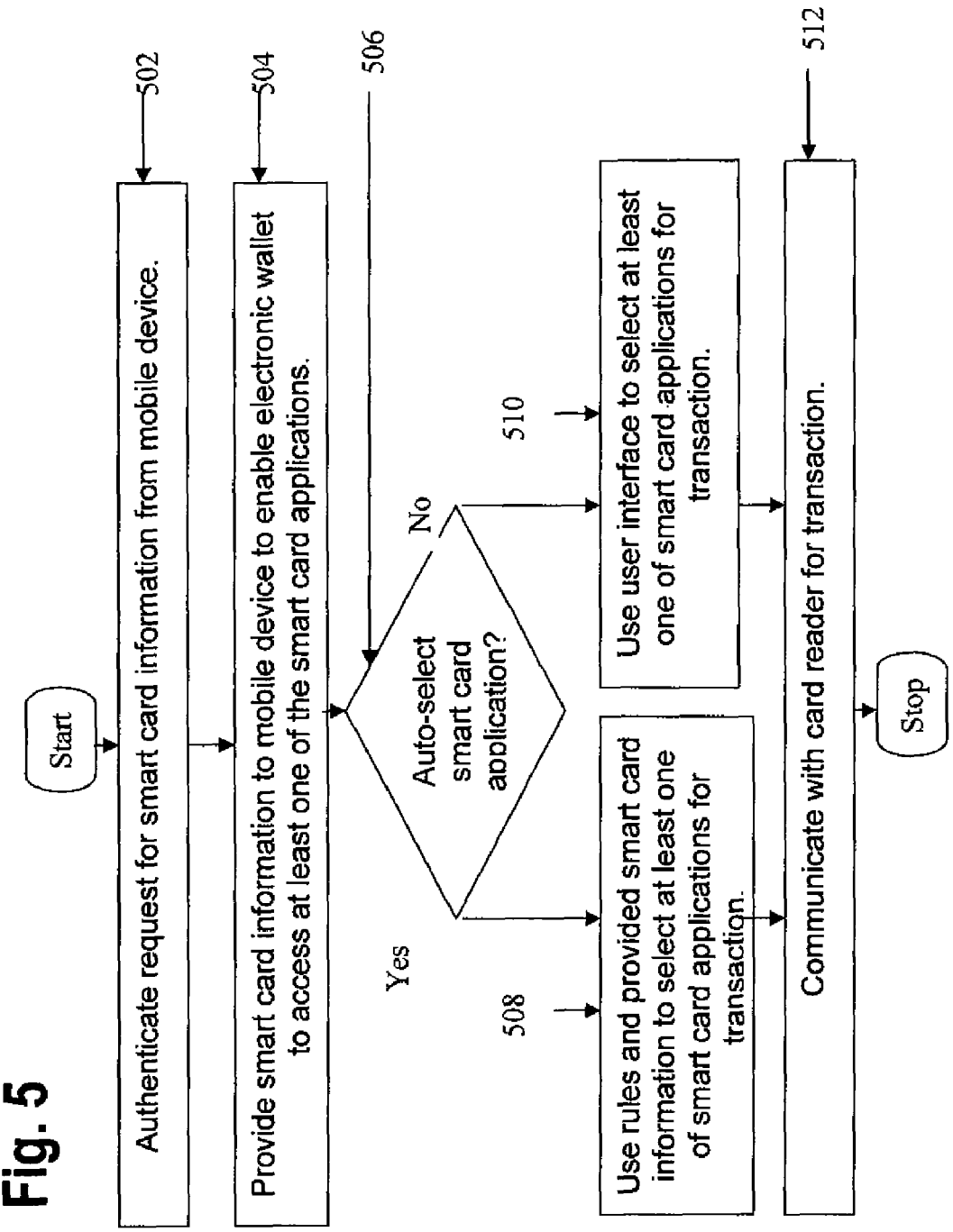
FIG. 5 shows a flowchart of a method for mobile device-based smart card operation according to some embodiments of the present disclosure.

FIG. 5 is a flowchart illustrating an embodiment of a method for mobile device-based smart card operation according to an embodiment of the present disclosure. A mobile device user may use the method to make a purchase at a commercial establishment using a smart card application. In one example, the mobile device user uses the electronic wallet 310 to select the smart card application 402, 404, 406, or 408 in anticipation of a purchase. In another example, the mobile device 100 may be brought into the proximity of the card reader 114 at the commercial establishment. Then context information may be sent from the card reader 114 to the transaction component 238, which may convey the context information to the smart card manager 236. Next, the smart card manager 236 may recognize that at least one of smart card applications 402, 404, 406, or 408 needs to be selected to make a purchase. Subsequently, the smart card manager 236 may send a signal to the electronic wallet 310 through the card controller 306 that smart card application 402, 404, 406, or 408 needs to be selected. However, in both examples the electronic wallet 310 does not have access enabling information required to select or access another vendor's smart card applications.

Because of security reasons, neither the electronic wallet 310 nor the mobile device 100 keeps the access enabling information. If the mobile device 100 kept the access enabling information, other devices communicating with the mobile device 100 might gain unauthorized access to this confidential information. Therefore, the electronic wallet 310 requests the access enabling information from the server 110. The electronic wallet 310 uses an application program interface to request smart card information, including access enabling information, from the server 110. The application program interface can authenticate a digital certificate from the electronic wallet 310 before requesting smart card information from the server 110. The application program interface can use alternative authentication approaches that are more robust and offer protection equal to or better than a digital certificate, approaches such as identifiers on the mobile device 100, a location of the mobile device 100, and a password entered through the keys 104.

In box 502, the server 110 authenticates a request for smart card information from the mobile device 100. For example, the server 110 may use a digital certificate sent with the request to authenticate the request, communicated through the cell tower 106 and the wired network 108, for the smart card information from the electronic wallet 310 in the mobile device 100. The server 110 may use the digital certificate to authenticate that the request for smart card information originated from the mobile device 100 where the corresponding smart card application is resident. Additionally, the server may verify that the smart card information indicates that the corresponding smart card application has not exceeded its credit limit, a credit bureau rates the mobile device user as sufficiently creditworthy, or that the mobile device, and hence the smart card application, has not been reported as stolen. The application provider server 112 may interact with the server 110 to provide the smart card information.

In box 504, the server 110 provides the smart card information to the mobile device 100 to enable the electronic wallet 310 to access at least one of the smart card applications, 402, 404, 406, or 408. For example, the server 110 may communicate the smart card information through the cell tower 106 and the wired network 108 to the electronic wallet 310 in the mobile device 100. The access enabling information included in the smart card information may be a map of the smart card applications on the smart card 234. Each smart card application may be identified by a smart card application identifier. The electronic wallet 310 may use each smart card application identifier to identify, access, and select a corresponding smart card application on the smart card 234.

In box 506, the electronic wallet 310 determines whether to auto-select the smart card application. For example, the electronic wallet 310 may use the rules 410, the provided smart card information and any context information to determine that the electronic wallet 310 may automatically select a smart card application for a transaction. The electronic wallet 310 may retrieve the rules either internally or from the server 110. In another example, the electronic wallet 310 may use the rules 410, the provided smart card information and any context information to determine that the electronic wallet 310 may provide the option of selecting a smart card application to the mobile device user through a user interface. If the electronic wallet 310 determines to auto-select the smart card application, the method proceeds to box 508. If the electronic wallet 310 determines not to auto-select the smart card application, the method proceeds to box 510.

In box 508, the electronic wallet 310 may use the set of rules 410 and the provided smart card information to select at least one of the smart card applications for a transaction. The electronic wallet 310 may use the context-based rules 410 and the provided smart card information with any context information received from the card reader 114. Using the rules 410, the provided smart card information, and any context-based information, the electronic wallet 310 determines a category of smart card application to use for the purchase and then selects the specific smart card application 402, 404, 406, or 408 within the determined category. The electronic wallet 310 conveys this selection and the provided smart card information through the card controller 306 to the smart card manager 236. Then the method proceeds to box 512.

In box 510, the mobile device user may use a user interface to select at least one of the smart card applications for the transaction. In an example, if the rules 410 and the provided smart card information indicate that the mobile device user is to select a smart card application, the electronic wallet 310 may choose smart cards applications to present to the mobile device user. Then the electronic wallet 310 prompts the mobile device user to select one of the chosen smart card applications for the transaction via a list of smart card applications presented by a user interface, such as the display 102. Next, the mobile device user selects the chosen smart card application to be used. Subsequently, the electronic wallet 310 conveys this selection and the provided smart card information through the card controller 306 to the smart card manager 236.

In another example, if the context-based rules 410 and the provided smart card information indicate that more than one smart card application may be used for the current context, the electronic wallet 310 may select several smart cards applications based on processing the rules 410. Then the electronic wallet 310 prompts the mobile device user to select one of the several smart card applications for the transaction via a list of the several smart card applications presented by a user interface, such as the display 102. Next, the mobile device user selects one of the several smart card applications to be used. Subsequently, the electronic wallet 310 conveys this selection and the provided smart card information through the card controller 306 to the smart card manager 236.

In yet another example, if there is not enough context information for the electronic wallet 310 to select the smart card 402, 404, 406, or 408, an interface on the mobile device 100 can offer a list of appropriate smart cards on the display 102 to the mobile device user. When the mobile device user manually selects the smart card application 402, 404, 406, or 408, from this list, the electronic wallet 310 conveys this selection and the provided smart card information through the card controller 306 to the smart card manager 236.

In any of the examples, the electronic wallet 310 may remember the selection made by the mobile device user and apply the selection to refine the context-based rules 410. That is, in a similar context in the future, the electronic wallet 310 may automatically select the same smart card application that the mobile device user selected manually or may offer that smart card application to the mobile device user as the preferred smart card application for the current context. The processing capacity to perform this automatic learning may reside in the mobile device 100 itself or on the server 110 with which the mobile device 100 may communicate.

In box 512, the selected smart card application communicates with the card reader 114 for the transaction. For example, the electronic wallet 310 may use the selection of a smart card application and the provided smart card information to signal the smart card manager 236 through the card controller 306 to activate the selected smart card application 402, 404, 406, or 408 to send payment information to the vendor device, such as the card reader 114. The smart card manager 236 may use the selection of the smart card application and provided smart card information to activate the selected smart card application to send the appropriate information via either a contact communication or a contact-less communication to the card reader 114. The mobile device 100 may prompt the mobile device user for confirmation or password entry before the smart card application sends the appropriate information to the card reader 114. Then the selected smart card application may send the appropriate information to the card reader 114. The card reader 114 may then process the information appropriately, for example by deducting a payment from a credit account.

In an example of the mobile device 100 being used in the manner of a RFID card, the mobile device 100 may be brought into the proximity of the card reader 114. The card reader 114 may emit a radio frequency signal that may be received by the transaction component 238. Then the transaction component 238 may communicate with the smart card manager 236, which may consult the electronic wallet 310 through the card controller 306. Applying the method described above, the electronic wallet 310 may select the appropriate smart card application 402, 404, 406, or 408 for the card reader 114. Next, the selected smart card application may be activated and send information to the card reader 114. Subsequently, the card reader 114 may process the information appropriately, for example by opening a gate or by deducting a toll from an account.

Figure 6:
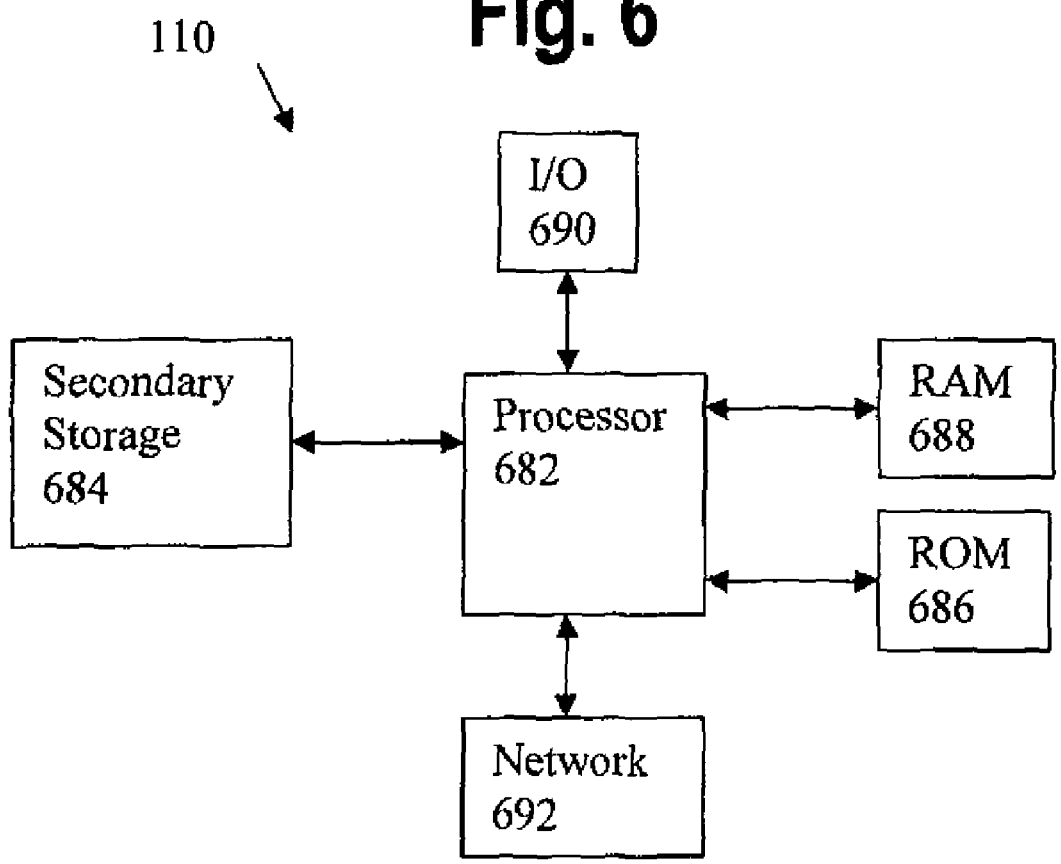
FIG. 6 shows an illustrative general purpose computer system suitable for implementing portions of the several embodiments of the present disclosure.

Parts of the system described above may be implemented on any general-purpose server with sufficient processing power, memory resources, and network throughput capability to handle the necessary workload placed upon it. FIG. 6 illustrates the server 110, which is suitable for implementing one or more embodiments disclosed herein. The server 110 includes a processor 682 (which may be referred to as a central processor unit or CPU) that is in communication with memory devices including secondary storage 684, read only memory (ROM) 686, random access memory (RAM) 688, input/output (I/O) 690 devices, and network connectivity devices 692. The processor may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O 690 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 692 devices may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity 692 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692.

While several embodiments have been provided in the present disclosure, it should be understood that the disclosed systems and methods may be embodied in many other specific forms without departing from the spirit or scope of the present disclosure.

The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for mobile device-based control of smart card operation comprising:
    authenticating, by a server, a request for access enabling information from a mobile device, wherein the mobile device comprises an electronic wallet and a plurality of smart card applications, wherein the electronic wallet cannot access the plurality of smart card applications or information associated with the plurality of smart card applications without the access enabling information, wherein the electronic wallet generates the request for access enabling information, and wherein the access enabling information comprises a map of the plurality of smart card applications that includes a smart card application identifier for each of the plurality of smart card applications; and
    providing, by the server, the access enabling information to the mobile device, wherein the electronic wallet uses the access enabling information to gain access to at least one of the plurality of smart card applications on the mobile device and the information associated with the at least one of the plurality of smart card applications.

2. The method of claim 1, wherein the electronic wallet cannot select the plurality of smart card applications for a transaction without the access enabling information, and wherein the electronic wallet uses at least the access enabling information to select the at least one of the plurality of smart cards for the transaction.

3. The method of claim 1 further comprising:
    authenticating, by the server, a request for smart card information, wherein the request for smart card information comprises the request for access enabling information; and providing, by the server, the smart card information to the mobile device, wherein the smart card information comprises the access enabling information.

4. The method of claim 1, wherein authenticating the request for access enabling information from the mobile device comprises using a digital certificate to authenticate the request for access enabling information from the mobile device.

5. The method of claim 1 further comprising using a set of rules to select one of the plurality of smart card applications for a transaction.

6. The method of claim 1 further comprising using a user interface to select one of the plurality of smart card applications for a transaction.

7. The method of claim 1, wherein the plurality of smart card applications is further defined to comprise information for use of accounts related to at least one of a loyalty card, an identification card, a credit card, a coupon card, a security card, an access card, and a rewards card.

8. A system for mobile device-based control of smart card operation comprising:
a server to:
authenticate a request for access enabling information from a mobile device that comprises an electronic wallet and a plurality of smart card applications, wherein the electronic wallet cannot access the plurality of smart card applications or information associated with the plurality of smart card applications without the access enabling information, wherein the electronic wallet generates the request for access enabling information, and wherein the access enabling information comprises a map of the plurality of smart cards that includes a smart card application identifier for each of the plurality of smart card applications, and
provide the access enabling information to the mobile device, wherein the electronic wallet uses the access enabling information to gain access to at least one of the plurality of smart card applications on the mobile device and the information associated with the at least one of the plurality of smart card applications.

9. The system of claim 8, wherein the server uses a digital certificate to authenticate the request for access enabling information from the mobile device.

10. The system of claim 8, wherein the electronic wallet uses a set of rules to select one of the plurality of smart card applications for a transaction.

11. The system of claim 8, wherein the mobile device further comprises a user interface to select one of the plurality of smart card applications for a transaction.

12. The system of claim 11, wherein the one of the plurality of smart card applications communicates with a card reader via one of a contact communication and a contact-less communication for the transaction.

13. The system of claim 12, wherein the communication is further defined as one of a radio frequency communications, code division multiple access communications, digital telephone communications, wireless telephone communications, and infra-red communications.

14. The system of claim 8, wherein the plurality of smart card applications are further defined to comprise information for use of accounts related to at least one of a loyalty card, an identification card, a credit card, a coupon card, a security card, an access card, a debit card, and a rewards card.

15. The system of claim 8, wherein the electronic wallet selects several of the plurality of smart card applications based on processing a set of rules, and wherein a user selects one of the several of the plurality of smart card applications for a transaction via a list presented by a user interface.

16. The system of claim 8 further comprising the server to:
authenticate a request for smart card information from the mobile device, wherein the request for smart card information comprises the request for access enabling information, and
provide the smart card information to the mobile device.

17. The system of claim 16, wherein the smart card information comprises at least one of an account number, an account limit, and an account balance for at least one of the plurality of smart card applications.

* * * * *